United States Patent [19]

Kennedy

[11] Patent Number: 5,427,466
[45] Date of Patent: Jun. 27, 1995

[54] COUPLING FOR REMOTE CONTROL OF AN ENGINE

[75] Inventor: Patrick A. Kennedy, Milwaukie, Oreg.

[73] Assignee: Williams Controls, Inc., Portland, Oreg.

[21] Appl. No.: 119,420

[22] Filed: Sep. 9, 1993

[51] Int. Cl.⁶ .............................................. F16D 3/00
[52] U.S. Cl. .................................. 403/117; 403/113
[58] Field of Search ........................ 403/113, 116, 117

[56] References Cited

U.S. PATENT DOCUMENTS

| | | | |
|---|---|---|---|
| 2,547,572 | 4/1951 | Flesch | 403/117 |
| 4,671,696 | 6/1987 | Suzuki et al. | 403/113 |
| 4,858,962 | 8/1989 | Bolling et al. | 403/113 |
| 4,943,181 | 7/1990 | Murphy | 403/116 |
| 5,149,223 | 10/1992 | Watts | 403/116 |

FOREIGN PATENT DOCUMENTS 0469412  2/1992  European Pat. Off. ............ 403/113

Primary Examiner—Thomas E. Denion
Assistant Examiner—Mark Sgantzos
Attorney, Agent, or Firm—Robert L. Harrington

[57] ABSTRACT

A coupling for coupling a lever to a sensor, e.g., a potentiometer for remote control of the throttle speed of a motor. The coupling includes a die cast housing wherein configured end cavities are interconnected by a through bore. One of the cavities is configured to have bosses that form rotative stops. A bushing is positioned in the through bore and the combination provides a sub-assembly. A second sub-assembly includes a shaft with a cross pin that is adapted to seat between the bosses with the shaft inserted into the bushing. With the shaft assembly seated, a retainer ring is placed on the opposite end of the shaft to cooperatively (cooperative with the cross pin) retain the shaft sub-assembly to the housing. A lever is attached to one end and the other end is connected to the sensor. The spaces between the bosses provide the desired rotative limits for the shaft to generate the range of throttle positions between full throttle and idle.

3 Claims, 2 Drawing Sheets

COUPLING FOR REMOTE CONTROL OF AN ENGINE

FIELD OF THE INVENTION

This invention relates to a coupling for coupling a manual control member to a sensor unit including a potentiometer used for remote control of an engine.

BACKGROUND OF THE INVENTION

Motor speeds are commonly controlled by the manual movement of a lever connected to the motor's throttle. An operator can physically vary the position of the lever between two extremes to adjust the motor speed from idle to maximum speed and to anything in between. In those cases where the operator is positioned at a point remote from the motor, a control station includes a lever and the lever is connected by a cable to the motor. The cable physically simulates operator control of the remote control lever to provide the desired throttle adjustment.

More recently the cable has been replaced with electronic sensors, typically including a potentiometer connected to the remote control, and a throttle control on the motor that is responsive to the electronic signals generated by the sensor to accordingly vary the throttle setting. Very simply, the lever shaft is mounted on a pivotal shaft that is coupled to the potentiometer shaft whereby rotation of the lever shaft rotates the shaft of the potentiometer. The electronic output of the potentiometer/sensor is directly related to the rotation of its shaft. The throttle control thus receives a varying electronic signal that indicates the rotative position of the lever and controls the speed of the motor in direct relation thereto.

Rather than a lever turning a cable, the lever turns a potentiometer shaft. The lever preferably has its own housing with a shaft that couples to the shaft of the potentiometer/sensor. It is important that the lever is maintained within an established range of rotation and that the shaft that is rotated by the lever is constrained to achieve coupling to the potentiometer shaft but without axial urging or rotative turning beyond the established range for the lever.

To accommodate this criteria, the lever and housing include multiple components including such items (in addition to the shaft and housing) as retention members, stop pins and bearings. Thus, as compared to the prior cable control, the lever control housing for accommodating the electronic sensor is substantially more complex and costly to produce. It is accordingly an objective of the present invention to provide the lever housing (sometimes referred to as the coupling between the lever and the sensor) with a far more simplified structure to substantially reduce the cost without sacrificing performance.

BRIEF SUMMARY OF THE INVENTION

The invention concerns the reduction of parts of the housing as well as a simplification of assembly. In a preferred embodiment, the housing is produced by aluminum die casting. The casting includes a configured interior that includes a cavity portion at each end and a through bore extended between the cavities. A self-lubricated bearing is press fit into the through bore and a shaft extends through the bushing with the ends of the shaft protruded into the cavities.

The cavities are configured to form shoulders at each end of the through bore. With the shaft in place, one end is adapted to inter-engage with the potentiometer shaft and the other end is adapted to receive a lever. A retainer ring on the shaft is abutted against the shoulder at the opposite end opposite the potentiometer and restricts axial movement toward the potentiometer shaft. A pin protruded through a hole oriented crossway to the axis of the shaft is abutted against the opposite shoulder of the through bore and prevents withdrawal of the shaft away from the potentiometer.

The cavity in the housing surrounding the pin is shaped to allow a prescribed pivotal movement of the pin. Stop lugs protrude into the path of the pin and dictate the allowed pivotal turning of the shaft. The total parts include a configured housing, a bushing, a shaft, a retainer ring and a cross pin. The configured housing is inexpensively die cast to include the stop lugs and the remaining components are readily assembled to the housing to provide the desired coupling as between a lever and a potentiometer.

The invention will be more clearly understood and appreciated upon reference to the detailed description and drawings referred to therein.

DETAILED DESCRIPTION

Figure 1:
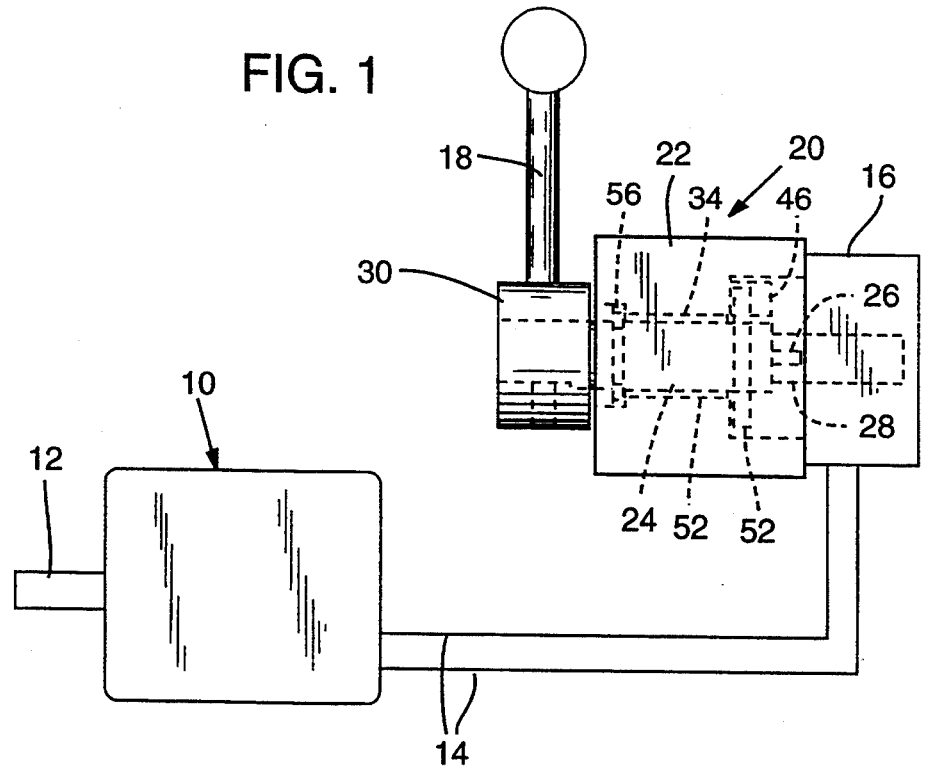
FIG. 1 is a view of a coupling that couples a manual control lever to a sensor which is electronically connected to a motor.

With reference to FIG. 1 of the drawings, illustrated is a motor 10 which is schematically illustrated and is intended to represent a wide range of motors having an output (e.g., shaft 12) that is varied by a throttle control. An electronic monitor in the motor receives electronic signals through conductors 14 and converts those signals into throttle commands for generating the indicated output speed. These components are known to the industry and will not be discussed in detail.

The signals conveyed to the motor's monitor through conductors 14 are generated by a sensor 16, typically a potentiometer or including a potentiometer. A potentiometer is typified by an internal rotatable shaft that initiates the output of an electronic signal, e.g., through conductors 14. The signal increases/decreases in intensity as the rotatable shaft is rotated. Thus, as the rotatable shaft is rotated, e.g., clockwise, the signal output will increase proportionately while counter clockwise rotation produces the reverse result.

A simple lever could be directly connected to the potentiometer shaft. However, that is not desirable for a number of reasons. For one, the potentiometer shaft should be protected from axial impact. It also needs to be protected against rotative over-travel. Whereas a potentiometer is often provided with rotative capacity for diagnostic applications, this capacity exceeds the desired operating range for an engine throttle. The engine throttle has limits as between idle and full open throttle and the engine's monitor needs to identify those limits and the range of potentiometer signals conveyed through conductors 14 must be matched to those engine limits. Further, the lever will typically have a desirable rotative movement for achieving idle to full throttle and, thus, the rotative movement of the potentiometer shaft for achieving minimum to maximum signal range needs to be matched to the desired lever movements.

The above considerations are all accommodated by providing a specifically designed coupling that couples the sensor 16 to the lever 18. As illustrated in FIG. 1, the coupling 20 includes a housing 22 having a shaft 24 extending therethrough and with one end 26 connected to the potentiometer shaft 28 and the other end 30 connected to the lever 18. The objectives as outlined above are achieved through the internal structure of coupling 20.

Providing a coupling to satisfy the stated objectives is not new to the present invention. Heretofore, a typical coupling included a housing that resembled a thick wall cylindrical sleeve. A shaft was mounted in the sleeve opening with bearings at each end to permit rotative rotation of the shaft relative to the sleeve. The shaft portion intermediate the bearings carried a lateral protrusion and stop pins mounted in the sleeve wall projected into the rotative path of the lateral protrusion to limit the rotative movement of the shaft.

As very generally described above, this prior housing is characterized by starting with a thick wall cylinder that required numerous machining operations to accommodate the rotating protrusion of the shaft and assembly of the stop pins to name but a few. The shaft itself required fitting of the protrusion (e.g., a separate collar that was pinned to the shaft). Also included is, of course, the bearings. The accumulation of these components and their assembly generated a significant cost factor that was disproportionate in cost to the overall cost of the electronic remote control for a motor.

Figure 2:
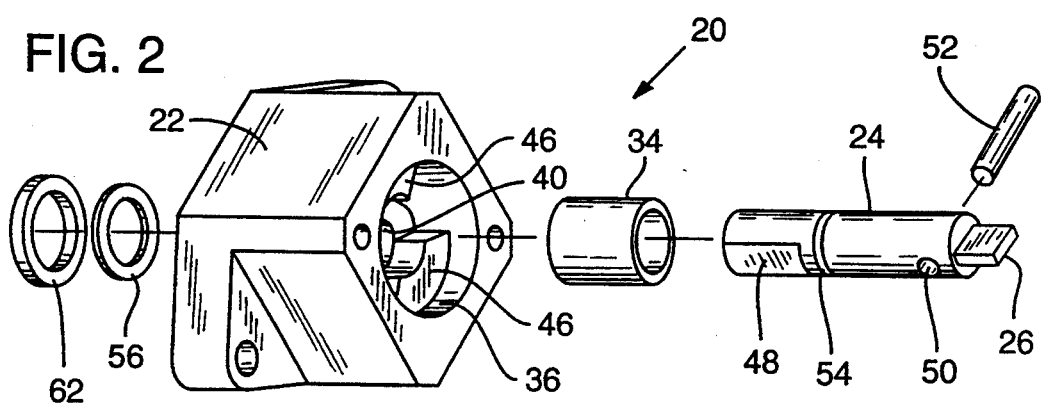
FIG. 2 is an exploded view of a coupling in accordance with the present invention which represents the coupling of FIG. 1.
Figure 3:
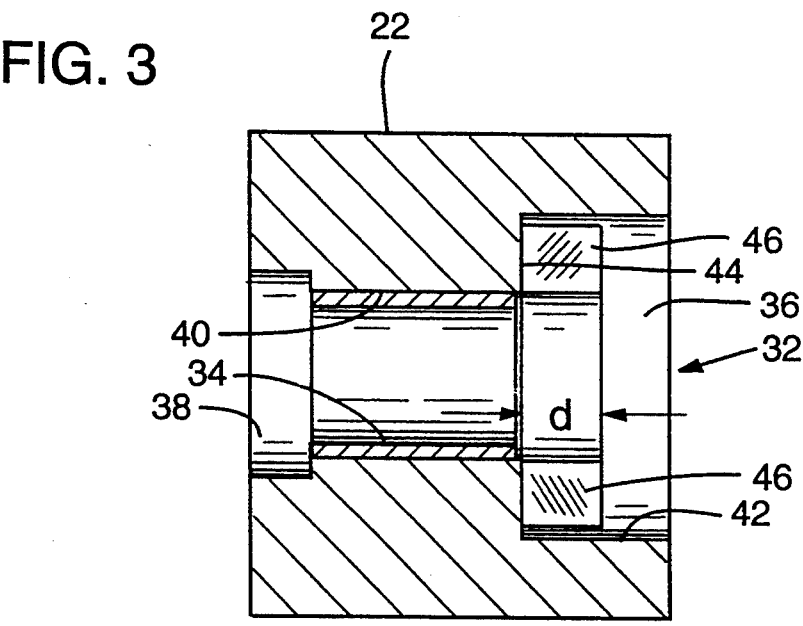
FIG. 3 is a section view of the housing assembly 22 of FIG. 2.
Figure 4:
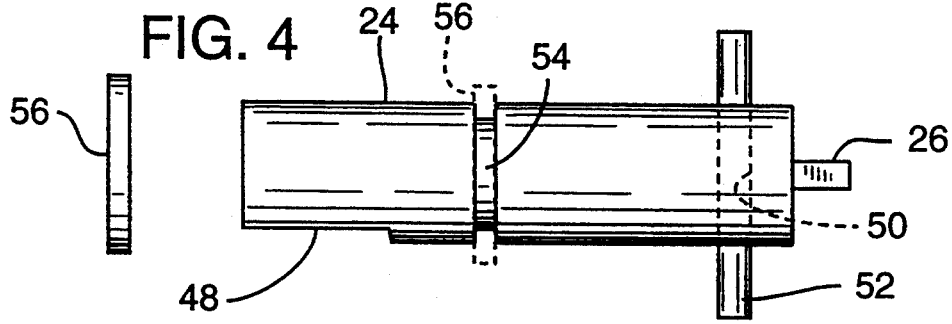
FIG. 4 is a view of the shaft assembly including the shaft and components that are pre-assembled to the shaft.

Reference is now made to FIGS. 2-4 for explanation of the preferred coupling of the present invention. For purposes of explanation, the coupling 20 will be considered to have two basic sub-assemblies, i.e., the housing sub-assembly and the shaft subassembly illustrated respectively in FIGS. 3 and 4.

Figure 5:
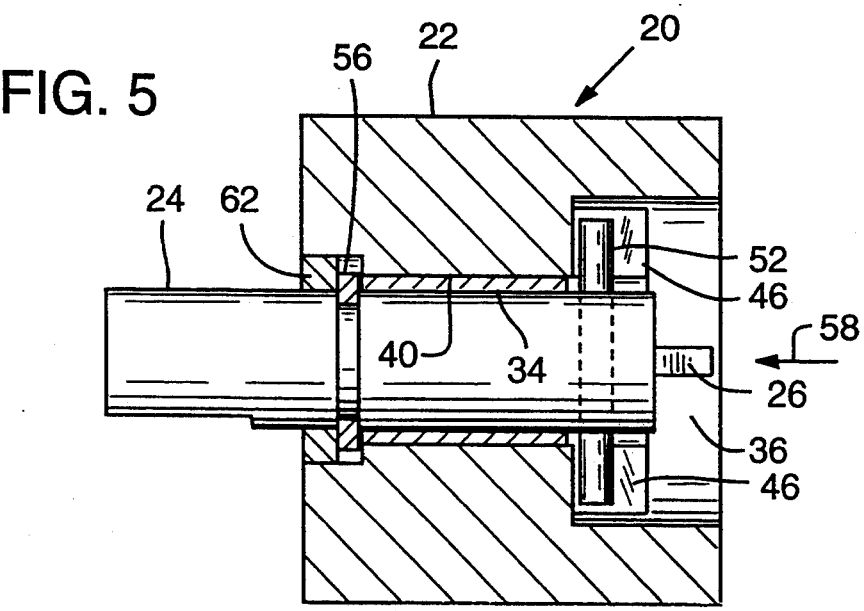
FIG. 5 is a section view similar to FIG. 3 but illustrating the sub-assemblies of FIGS. 3 and 4 fully assembled.

The housing 22 of the present invention is an aluminum die casting which has a configured interior 32 produced in the die casting process. To complete the housing sub-assembly only the bushing 34 needs to be press fit into the housing. As illustrated in the drawings of FIGS. 2, 3 and 5, the configured interior has two end cavities 36, 38 interconnected by a through bore 40 (in which bushing 34 resides).

End cavity 36 is generally cylindrical having a circular wall 42 and an end wall 44 surrounding the through bore 40. Projected outwardly from the end wall 44 (or inwardly from circular wall 42) are configured bosses 46. The symmetrical spaces between the bosses 46 within the depth d of the bosses and bordered by end wall 44 and circular wall 42, define a restrictive rotative passage which will be made apparent hereafter. The opposite end cavity 38 is simply cylindrical in shape. The die casting of the housing 22 is not complex but as will be appreciated, it provides the desired nesting for the shaft sub-assembly which will now be explained.

The shaft assembly is illustrated in FIG. 4. It includes a center section first end 26 that is mated to the shaft 28 of the potentiometer 16 (FIG. 1). A second end 48 is configured to interconnect with a lever and can take any one of many different forms. A cross car is provided by a through bore 50 which receives a press fit pin 52 and a peripheral groove 54 is adapted to receive a shaft retaining ring 56 shown in dash lines mounted to the shaft in FIG. 4 and in full lines exploded from the shaft. The assembly without the shaft retainer ring 56 is preassembled and the retainer ring 56 is added after full assembly as will be explained in connection with FIG. 5.

As will be appreciated, the housing assembly is of simple construction requiring the formation of the cavities and bosses 46 in a casting operation followed by the insertion of the bushing 34. Similarly the shaft assembly is simple in construction requiring few machining operations and the press fit insertion of pin 52. As seen in FIG. 5, the shaft assembly is simply inserted into the housing through end cavity 36 (note arrow 58) and with the shaft assembly fully inserted, the retainer ring 56 is placed over end 30 of the shaft and onto groove 54 where it abuts shoulder 60 formed at the inner end of cavity 38 surrounding through bore 40. In this position, the pin 52 is seated in the spacing defined by bosses 46. The pin 52 is positioned immediately adjacent end wall 44 and in cooperation with retainer ring 56 secures the shaft to the housing and prevents relative axial movement. The pin 52 being captured in the spaces between the bosses 46 allows restrictive rotative movement of the shaft 24. As a final step which may or may not be necessary, a shaft lip seal 62 is placed over end 30 and positioned against retainer ring 56 to seal out dust and dirt. End 26 is sealed by the connection to the sensor 16 as indicated in FIG. 1.

In summary, the invention is directed to simplification of a coupling as between a sensor and a lever for remote control of a motor throttle. This simplification is provided at least in part by the die cast housing which provides the prescribed "stops" for the shaft rotation and in part by the interfitting of the two subassemblies whereby each is of simple construction and are combined in a simple operation to replace what had previously been a relatively expensive component of the remote control for a motor. Whereas those skilled in the art will conceive of numerous modifications and variations to the described embodiment while retaining the basic concept, the invention is not limited to the described embodiment but rather encompasses the definition of the appended claims.

What is claimed is:

1. In a remote control for controlling the throttle speed of an engine wherein a sensor is coupled to a lever through a coupling, said coupling comprising;
   a die cast housing having a through bore having opposed ends, one end of the through bore opens into an enlarged end cavity, said cavity provided with a boss protruded into the end cavity from said end wall,
   a shaft assembly including a shaft having a center section residing in the through bore of the housing with opposed ends extending beyond the ends of the through bore for engagement with the sensor and lever, a cross bar protruded from the shaft in the end cavity of the housing, said shaft being rotatable and said cross bar defining a rotatable path that is restricted by the boss of said housing, and a retaining member mounted to the shaft to prevent axial movement of the shaft through the through bore.

2. A coupling as defined in claim 1 wherein a bushing is provided in the through bore of said housing surrounding the center section of said shaft assembly, a shoulder at the end of the through bore opposite the end cavity, and said retaining member including a retaining ring mounted to the shaft end and abutting said shoulder, said cross bar preventing axial movement of the shaft through the through bore in one direction and said retaining ring preventing axial movement of the shaft through the through bore in the opposite direction.

3. A coupling as defined in claim 1 wherein the cross bar is a pin projected through a through bore opening in said shaft.

* * * * *